(12) United States Patent
Horigami et al.

(10) Patent No.: US 7,318,772 B2
(45) Date of Patent: Jan. 15, 2008

(54) GAME PROGRAM AND GAME MACHINE WITH AN OBTAINED CHARACTER ATTRIBUTES BLOCK ARRANGEMENT

(75) Inventors: Atsushi Horigami, Tokyo (JP);
Mayumi Takeuchi, Tokyo (JP)

(73) Assignee: Konami Corporation, Tokyo (JP)

( * ) Notice: Subject to any disclaimer, the term of this patent is extended or adjusted under 35 U.S.C. 154(b) by 502 days.

(21) Appl. No.: 10/488,732

(22) PCT Filed: Mar. 26, 2003

(86) PCT No.: PCT/JP03/03685

§ 371 (c)(1),
(2), (4) Date: Mar. 5, 2004

(87) PCT Pub. No.: WO2004/018061

PCT Pub. Date: Mar. 4, 2004

(65) Prior Publication Data

US 2004/0235544 A1 Nov. 25, 2004

(30) Foreign Application Priority Data

Aug. 22, 2002 (JP) .............................. 2002-241955

(51) Int. Cl.
*A63F 9/24* (2006.01)
(52) U.S. Cl. ........................................................ 463/8
(58) Field of Classification Search .................... 463/9, 463/32, 36
See application file for complete search history.

(56) References Cited

FOREIGN PATENT DOCUMENTS

| JP | 2000-157731 A | 11/1998 |
|---|---|---|
| JP | 2001-038047 A | 2/2001 |
| JP | 20000157731 | 11/2001 |
| JP | 2002-78959 A | 3/2002 |
| JP | 2003327885 | 9/2003 |

OTHER PUBLICATIONS

Diablo II (PC), Blizzard, Jun. 30, 2000, Diablo II The Offical Stragety Guide (Library of Congress #99-72855).*
www.planetdiablo.com (screen shot 1, and 2).*
Block Out (California Dreams-1989) http://en.wikipedia.org/wiki/Block_Out.*
Diablo II (PC), Blizzard, Jun. 30, 2000, Game Manual, Pertinent pp. 2-35 and 70-77.*
Diablo II The Ultimate Strategy Guide, 2001, Front Cover, Back Cover, Contents Page, Relevant p. 206.*

(Continued)

*Primary Examiner*—Ronald Laneau
*Assistant Examiner*—Tramar Harper
(74) *Attorney, Agent, or Firm*—Duane Morris LLP (57) ABSTRACT

Game program is comprised of a procedure for setting a block arrangement space 20 having a plurality of block locations 20*a* so as to correspond to each character, a procedure for instructing to insert a skill block 21 corresponding to a skill into said block arrangement location 20*a*, a procedure for computing and judging as to whether or not there is a collision between an instructed position of the skill block to be inserted and the skill block already inserted into the block arrangement space and for informing a player of the collision if any, and a procedure for displaying a state of arrangement of the skill blocks in the block arrangement space.

6 Claims, 4 Drawing Sheets

OTHER PUBLICATIONS www.planetdiablo.com (screen shot 1 and 2).*
Block-Out (California Dreams—1989) http://en.wikipedia.org/wiki/block_out.*
"V Jump Books Game Series Final Fantasy VII" published by Shueisha on Mar. 10, 1997, pp. 28-32 (English translation of major parts).

"My Computer Basic Magazine No. 2" published by Denpa Newspaper on Feb. 1, 1990, pp. 288-290 (English translation of major parts).

* cited by examiner

GAME PROGRAM AND GAME MACHINE WITH AN OBTAINED CHARACTER ATTRIBUTES BLOCK ARRANGEMENT

TECHNICAL FIELD

This invention relates to game program and a game machine for setting a skill of a character appearing in a game with a block image represented on a display, having a predetermined size.

BACKGROUND ART

In a well-known conventional game, such as a role-playing game and an adventure game, a character appearing in the game is furnished with various kinds of skills, such as arms, a guard, special power, and fights against an enemy character with the power given by the skill owned by the character so as to develop the scenario.

In such a game program, the number of the skills to be equipped is determined in advance for each category of the skill, such as arms, a guard, an accessory and special power, and the player can not furnish a character with the skills over the number determined for each category.

When installing the skill, the player simply mechanically arranges the skill which was obtained in an event at a position determined in advance by the program, thereby decreasing the fun of the game.

With the above-mentioned conventional game program, but, it is impossible to diversify the power of a character, and it is inevitable to standardize the contents of the game to a degree. The fun of the game will be greatly improved if the player can be provided with some fun at the time of the installation of the skill.

Then, the developments of the game program and a game machine for diversifying a power of a character by allowing to combine skills with each other irrespective of a category thereof, and for providing a player with fun of a puzzle at the time when installing the skill have been desired.

DISCLOSURE OF INVENTION

Figure 4:
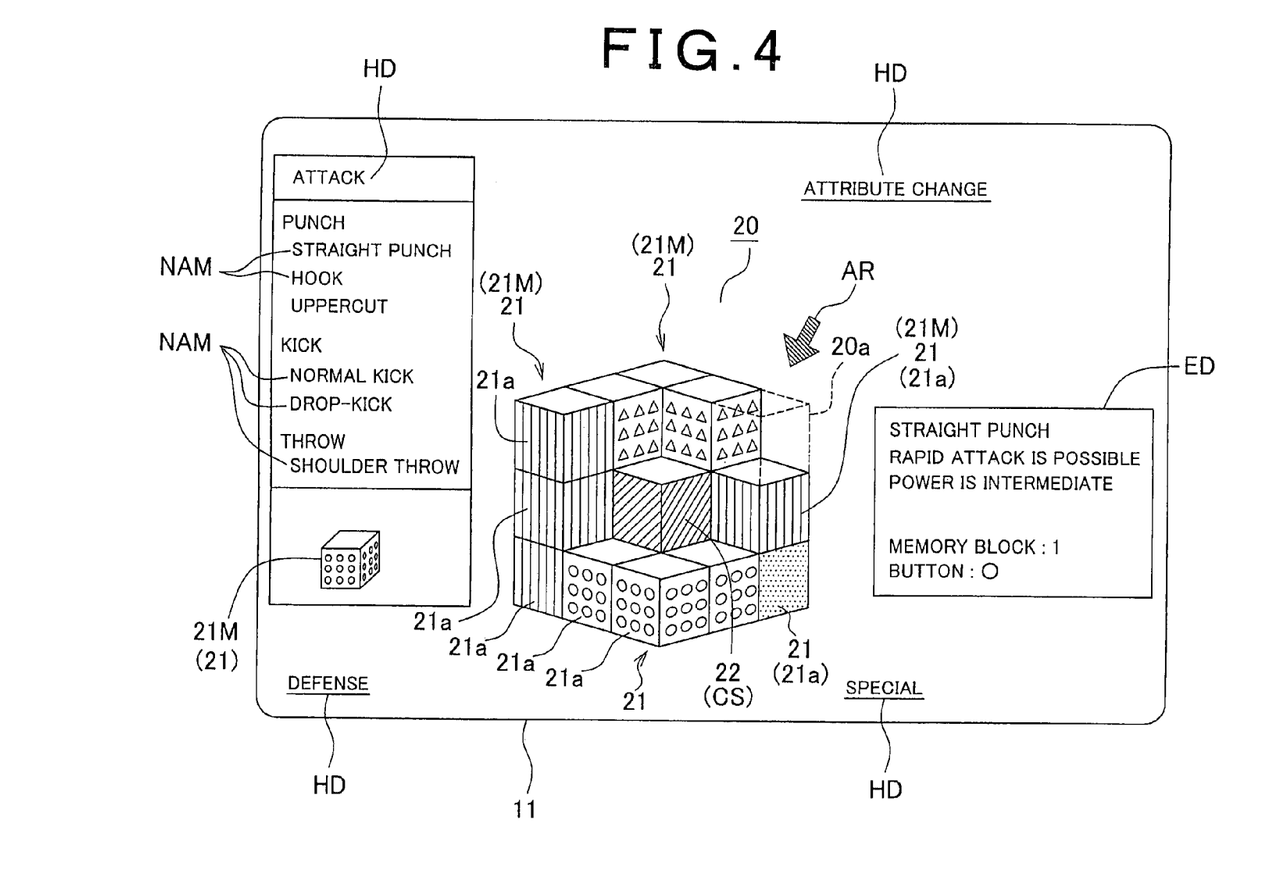
FIG. 4 is a representation on a display at the time when installing a skill.

According to one aspect, the invention is game program for getting a computer to execute the following procedures, comprising:
  a block arrangement space setting procedure, for setting a block arrangement space having a predetermined shape (such as a cube) in a predetermined memory, said block arrangement space being set in a virtual space so as to correspond to each character, and having a plurality of block arrangement locations;
  a skill block insertion arrangement procedure, for instructing to insert a skill block corresponding to said skill of said character in said block arrangement location inside said block arrangement space as an object in said virtual space through an instruction of a controller of said computer;
  a collision judgment procedure, for computing and judging as to whether or not there is a collision between a position of said skill block to be inserted, which was instructed by said skill block insertion arrangement procedure and said skill block already inserted into said block arrangement space, and for informing a player of said collision if any;
  a block arrangement space representation procedure, for producing a picture showing an arrangement state of said skill block in said block arrangement space (such as the picture of the memory cube 20 as shown in FIG. 4), and displaying said produced picture on a display; and
  a character representation control procedure, for furnishing said character with power corresponding to a skill defined by one or more skill blocks which were arranged in said block arrangement space, for exerting said power corresponding to said furnished skill in a game world, and for producing a picture of said character exerting said power and displaying it on said display.

In this case, the skill block corresponding to the skill with which the player expects to furnish the character is arranged in the block arrangement space having a predetermined shape without a collision with the other skill blocks already arranged in the block arrangement space, so that an optional category of skill can be inserted in the bounds of the block arrangement space so as to set the skill, thereby diversifying the power of the character.

Besides, the collision judgment procedure computes and judges as to whether or not there is the collision between the position of the skill block to be inserted, which was instructed by the skill block insertion arrangement procedure and the skill block already inserted into the block arrangement space, and informs the player of the collision, if any, so that it is necessary for the player to arrange the skill block in the block arrangement space without the collision, thereby providing the player with the fun of a puzzle when installing the skill.

According to one aspect of the invention, said skill block has a plane shape, and said block arrangement space is set as a plane space where a plurality of said skill blocks can be arranged.

In this case, the block arrangement space and the skill block can be dealt with the plane two-dimensional shape, thereby decreasing the burden of computing processing of the CPU. Besides, it is convenient when applying the invention to a two-dimensional game which basis is a sprite.

According to one aspect of the invention, said skill block has a three-dimensional shape, and said block arrangement space is set as a three-dimensional space where a plurality of said skill blocks can be arranged.

In this case, the block arrangement space and the skill block have the cubical three-dimensional shapes, thereby improving the fun of a puzzle at the time of the skill installation.

Figure 3:
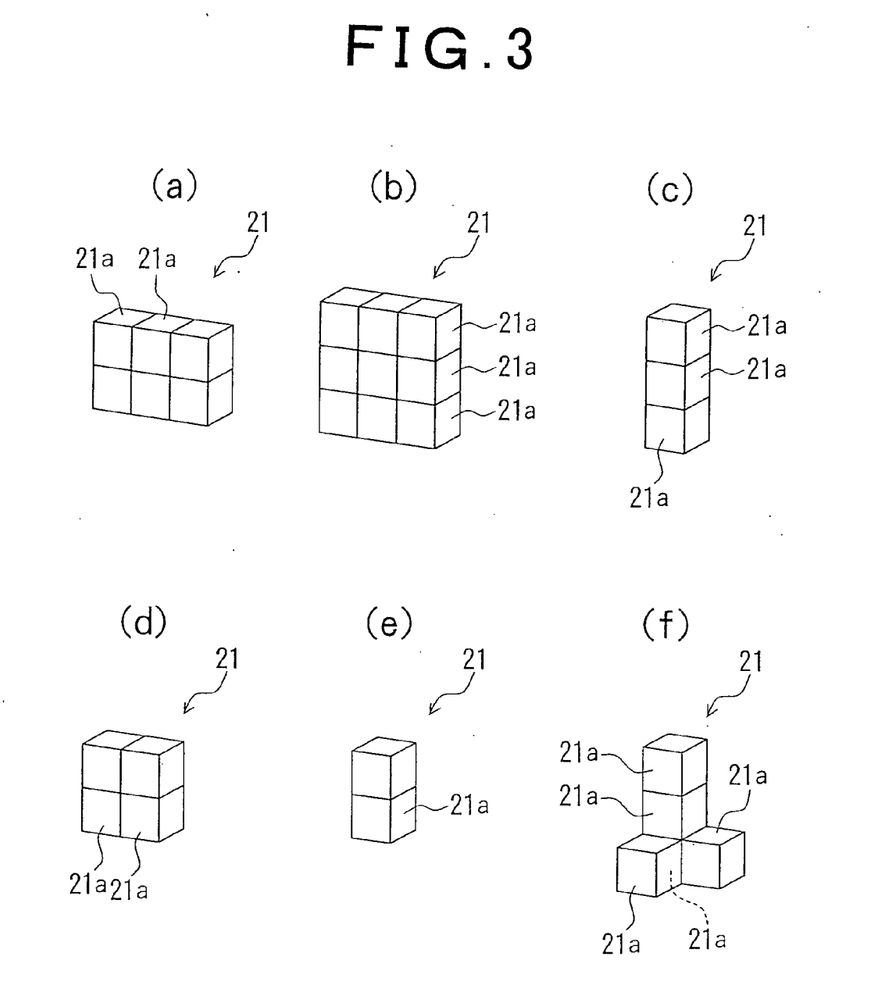
FIG. 3 is a view showing skill blocks.

According to one aspect of the invention, said skill block is formed by combination of one or more block units (such as the shape as shown in FIG. 3), and a shape of said block unit corresponds to a shape of said block arrangement location.

In this case, the shapes of the block unit and the block arrangement location correspond with each other, so that the player can easily recognize the arrangement state of the block units inside the block arrangement space. Besides, the proper skill block can be modeled since a basic unit is one block unit, and the combination of a plurality of block units can be used.

According to one aspect of the invention, said block arrangement space setting procedure has a procedure for setting an arrangement prohibitive location (such as the cubical space 20a portion where the core block 22 is arranged), where said skill block is impossible to be arranged, in a specific block arrangement location inside said block arrangement space.

In this case, the arrangement prohibitive location can limit the positions where the skill block can be arranged, thereby further improving the fun of a puzzle at the time of skill installation.

According to one aspect of the invention, said arrangement prohibitive location is set in almost center of said block arrangement space.

In this case, the arrangement prohibitive location is set at almost center of the block arrangement space, so that the arrangement prohibitive location can give bigger influence to the arrangement of the skill blocks. Therefore, how to arrange the skill block directly influences the skills of the character to be equipped, thereby further improving the fun of a puzzle at the time of the skill installation.

According to one aspect, the invention is structured as a game machine having the above-mentioned features.

The number in parentheses shows the corresponding element in the drawings for the sake of convenience, accordingly, the present descriptions are not restricted and bound by the descriptions on the drawings.

BEST MODE FOR CARRYING OUT THE INVENTION

Figure 1:
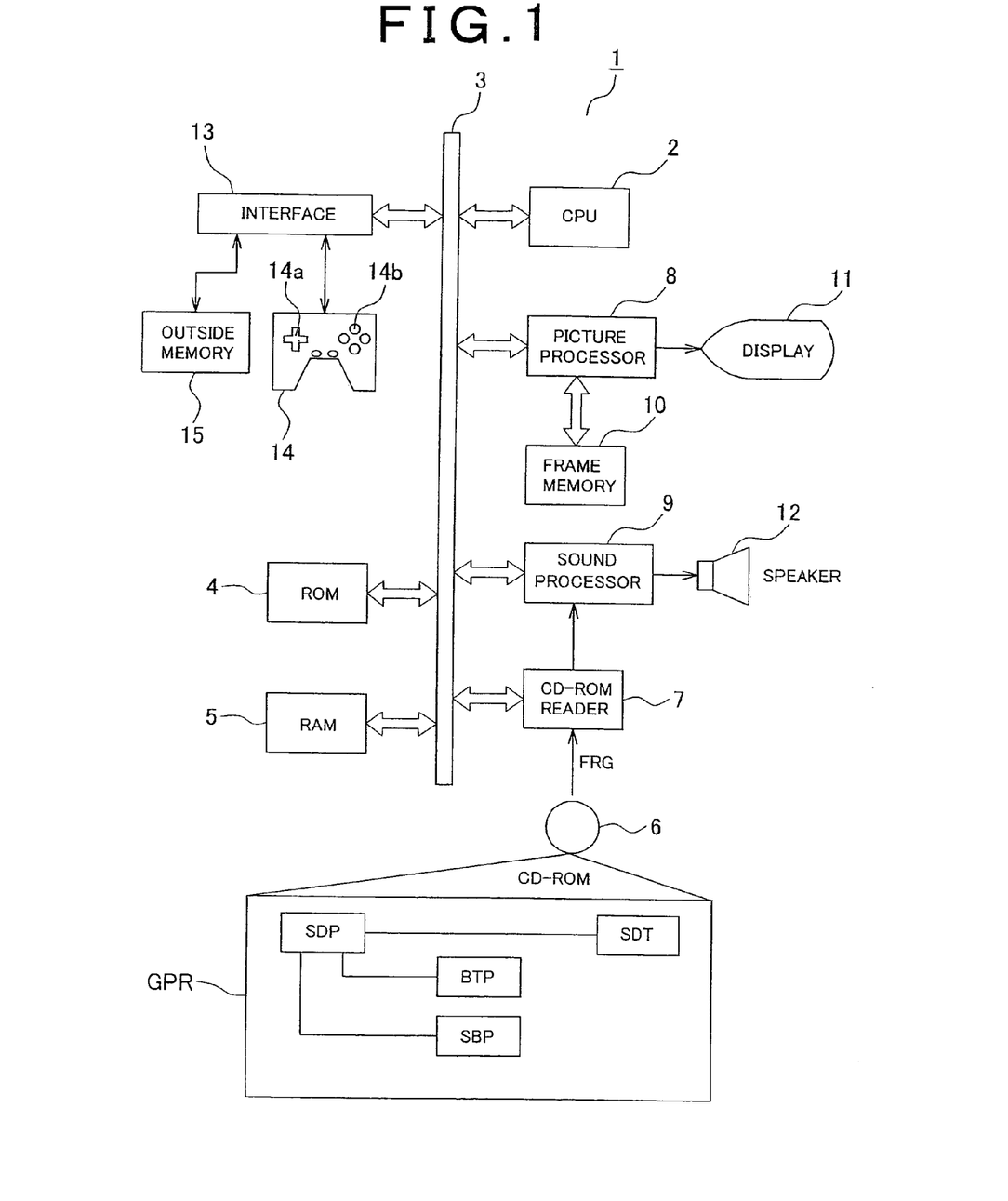
FIG. 1 is a block diagram of a game machine for home use to which the present invention is applied.

A game machine 1 as a computer has a CPU 2, main body of which is a microprocessor unit, as shown in FIG. 1. A ROM 4 and a RAM 5 which are main memories are connected with the CPU 2 through a bus 3. An operating system as program necessary for controlling the whole actions in the game machine 1 and data necessary for its execution are written into the ROM 4. Program and data for a game which are read out of a CD-ROM 6 as a storage medium through a CD-ROM reader 7 are written into the RAM 5. An area for temporarily storing various kinds of information necessary for a progress of a game is set according to the program read out of the CD-ROM 6 in the RAM 5. And, image data, which was read out of the CD-ROM 6 and processed by the CPU 2, is also stored in a predetermined video area secured in the RAM 5. A RAM dedicated for display processing may be separately provided. The game program may be supplied with a semiconductor memory, a DAD-ROM or any other storage medium in place of the CD-ROM 6.

An image processor 8 and a sound processor 9 are connected with the CPU 2 through the bus 3. The image processor 8 reads picture data from the video area of the RAM 5 so as to write a game picture in a frame memory 10, and converts the written picture into a video signal for displaying on a display 11 and outputs the converted with predetermined timing. The sound processor 9 converts the sound data in the CD-ROM 6 read out through the CD-ROM reader 7 into a predetermined analog signal so as to output through a speaker 12. The sound processor 9 produces data of effective sounds or music sounds on receipt of an instruction from the CPU 2, and converts the data into an analog signal so as to output through the speaker 12. Generally speaking, the display 11 is a television receiver for home use and the speaker 12 is a built-in speaker of the television receiver.

A controller 14 and an outside memory 15 are attachable and detachably connected with the bus 3 through an interface 13. The controller 14 has operational members for receiving operations by a player, such as a cross key 14a for inputting up, down, right and left directions and a push button switch 14b. The controller 14 outputs a signal corresponding to the operations of the operational members 14a, 14b at constant cycles (for instance, at 60 cycles per a second), and the CPU 2 judges the operation state of the controller 14 on the basis of the signal. The outside memory 15 has a rentable semiconductor storage element which can memory, and data, such as one showing a state of a progress of a game, are stored therein according to the instruction by a player. The outside memory 15 may be an element of a portable game machine, which is attachable to and detachable from the interface 13.

The CD-ROM 6 stores game program GPR, such as a role-playing game and an adventure game. In such a game program, a character appearing in the game obtains various kinds of skills, being dependent of a development of the scenario and is equipped with such skills so as to have power corresponding to a category of the skill, and the later scenario is developed in such a state. That is, the skill of the character can be set in such a game program.

When executing a predetermined initializing operation (power-on operation, for instance) in the game machine 1, the CPU 2 firstly executes predetermined initializing processing according to the program of the ROM 4. When finishing initialization, the CPU 2 starts to read the game program GPR Stored in the CD-ROM 6, and starts game processing according to the program. When a player operates the controller 14 so as to execute a predetermined game start operation, the CPU 2 starts various kinds of processes necessary for the execution of the game according to the procedures of the game program GPR On the basis of the instruction.

Thereafter, the game machine 1 executes predetermined processes according to the read game program GPR, controls to display a picture on the display 11, and controls the predetermined scenario to proceed.

The character in a game world appearing by execution of the game program GPR Can obtain various kinds of skills, such as predetermined arms, an item, a guard and special power, being dependent on the development of the scenario. In such a case, the player furnishes a character who obtained a skill or the other character with the obtained skill by proper operation of the controller 14, referring to the representation on the display 11, and a power given to the skill can be added to the character who the player furnished.

In such a case, the player instructs the CPU 2 to display a skill setting picture on the display 11 through the operation of the controller 14 in order to equip a proper character who the player expects to equip with an obtained skill. Receiving this instruction, the CPU 2 reads out skill setting program SDP which is a sub-routine of the game program GPR, and executes a skill setting operation on each character on the basis of the skill setting program SDP.

The skill setting program SDP instructs the CPU 2 to read out a memory cube 20 which shows setting state of skills of the character whom the player instructed to set a skill. Receiving this instruction, the CPU 2 reads out the memory cube 20 for the character which is stored in the outside memory 15, thereby storing in the RAM 5 and displaying on the display 11, as shown in FIG. 4 for instance.

The outside memory 15 sets and stores data concerning the memory cube 20 of the character who finished skill setting by the player, of all characters appearing in the game world produced by the game program GPR, for whom the skill setting is possible, by the skill setting program SDP, and information concerning the memory cube 20 of the corresponding character is immediately read out through character selection operation of the controller 14 by the player, so that the picture of the memory cube 20 can be displayed on the display 11 on the basis of this information.

Figure 2:
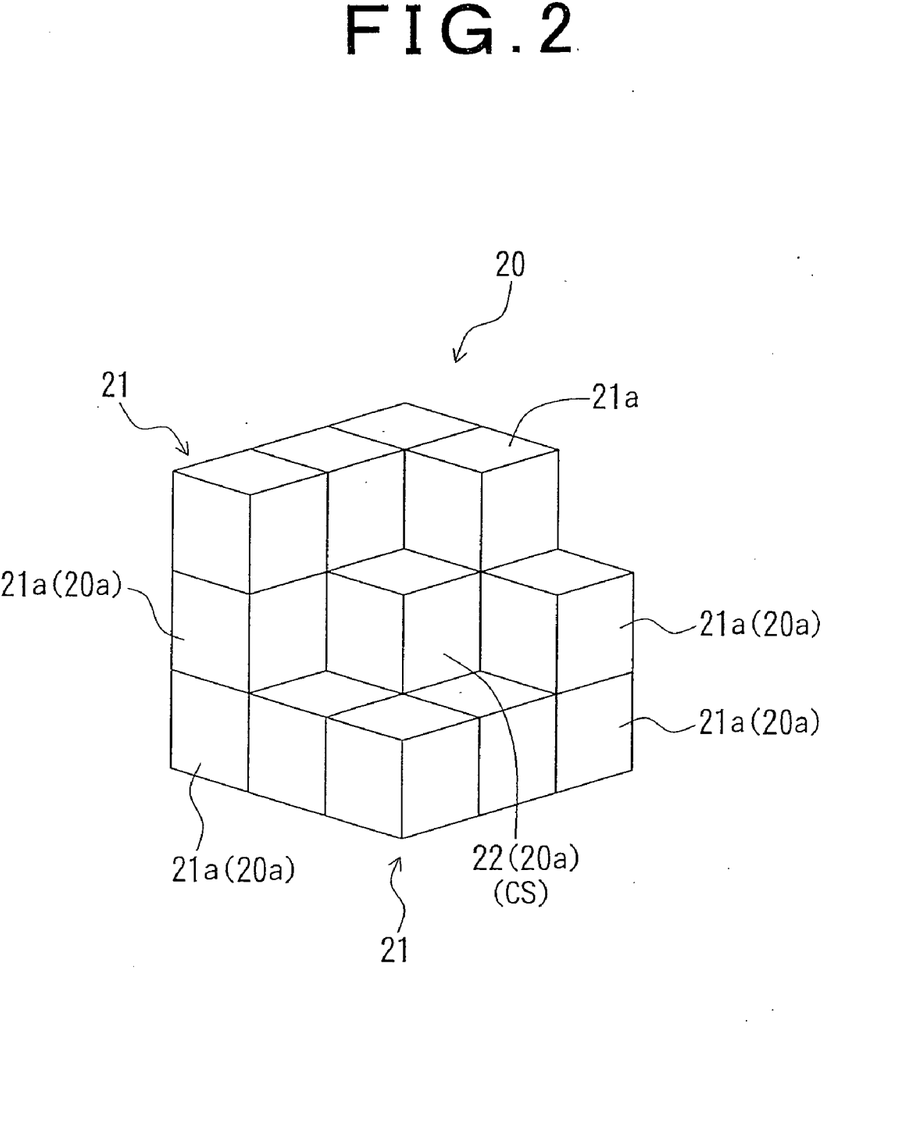
FIG. 2 is a view showing a memory cube.

The memory cube 20 is a space in the shape of a cube which is produced on a virtual three-dimensional coordinate, as shown in FIG. 2. In FIG. 2, each side has three units of length. The memory cube 20 is divided into equal twenty seven (27) parts in total by dividing each side into three equal parts and dividing the cubical space into small parts. That is, the memory cube 20 has twenty seven cubical spaces 20a, each having a length of one unit. Block unit(s) 21a comprising a skill block 21 for giving a predetermined skill to the character can be arranged in each cubical space 20a. Each block unit 21a is an object formed with a polygon or the like.

The memory cube 20 is like a case having a predetermined shape, to be used when giving a corresponding character a skill. The optional skill block 21 can be arranged in the virtual space inside the memory cube 20 as long as it does not interfere with the other arranged skill blocks 21. And, the skill setting program SDP controls so as to give the skill corresponding to the skill block 21 stored in the memory cube 20 to the character corresponding to the memory cube 20.

As already mentioned, twenty seven (27) cubical spaces 20a are defined in the memory cube 20. A core block 22 as a core space CS is arranged in advance in the cubical space 20a which is at the center of the memory cube 20. The skill setting program SDP controls so that the player can not arrange the skill block 21 in the core space CS. Therefore, the core block 22 of the core space CS may be furnished with special skill for the corresponding character, such as basic power and basic equipment, as a default value. In another embodiment, the core space CS may not be at the center. And, the memory cube 20 may be comprised without the core space CS.

After displaying the memory cube 20 of the character who is expected to be furnished with a skill on the display 11 through the operation of the controller 14 by the player as shown in FIG. 4, the player operates the controller 14 so as to arrange the skill obtained during the game in the memory cube 20. The skill obtained by the player in the game is any item in shape, such as a disc, a file, a crystal (The item which is defined as skill is referred to as "skill definition item" hereinafter.), and the item is converted into the skill block 21 by block conversion program BTP which is a subroutine of the skill setting program SDP with the operation of the player through the controller 14.

That is, following attribute data are defined in the skill definition item.
   a) system data showing a system of a skill
   b) contents data showing contents of a skill
   c) cube data showing number of cubical spaces to be consumed in the memory cube 20 and the skill block shape
   d) method of operating the controller 14 for getting a skill to appear.

These attribute data are stored in a skill definition item table SDT. In the game program GPR, corresponding to the respective skill definition items.

System data HD showing a system of a skill are as follows.
1) attack system: various kinds of skills to be used when attacking an enemy are defined therein. For instance, skills, such as punch, kick, fighting being seated, two-sword fencing, magic, various kinds of arms, and concrete name NAM of the technique, such as "straight punch", "hook" and "uppercut" concerning "punch" skill.
2) defense system: various kinds of skills to be used when defending an attack from an enemy are defined therein. For instance, skills, such as a physical shield, a magic shield and time control, and concrete technique name of these skills
3) attribute change system: for changing the attribute of an enemy or an ally. For instance, the skill for changing "fire" attribute which has an affinity against fire magic or fire attack, and "water" attribute which has an affinity against water magic or water attack, and concrete technique name of these skills
4) special system: skills, such as a mortal technique or special technique, and concrete technique names of the respective skills The above-mentioned system data HD can be optionally set when defining each skill, and can be properly set according to a kind or story contents of the game program GPR When convert the obtained skill definition item into the skill block 21 by the block conversion program BTP, the skill definition item table SDT. Is read out, and the CPU 2 produces through the picture processor 8 the appearance of the skill block 21 through which the player can easily recognize the system according to the system of the skill defined in the skill definition item and displays it on the display 11.

On the surroundings of the skill block 21 which represents the attack system of skill as shown in FIG. 4 for instance, round patterns are attached, the defense system of skill, triangular patterns are attached, the attribute change system of skill, striped patterns are attached, and the special technique of skill, sand patterns are attached. Such display forms of the skill block 21 are exemplary, and various display forms, such as distinction with colors and change with brightness are available when displaying the respective skill blocks 21 by each system.

The display forms of the skill definition item on the display 11 at the time of conversion into the skill block 21 are thus determined according to the system of skill which defines the skill definition item. At the same time, the CPU 2 reads the cube data concerning the skill definition item out of the attribute data in the skill definition item table SDT. By the block conversion program BTP, and judges the number of the cubical spaces 20a which the skill block 21 consumes in the memory cube 20, that is, the size of the skill block 21, and the shape of the skill block 21 on the basis of the cube data.

Various kinds of sizes and shapes of the skill blocks 21 which are defined by the cube data are set according to the contents of the skill furnished to the character, as shown in FIG. 3. Any skill block 21 has a shape obtained by the combination of one or more individual block units 21a, and is formed so as to being arranged in the memory cube 20.

For instance, the skill block 21 in FIG. 3(a) has the size and shape obtained by combination of six block units 21a in total so as to have a flat plate shape, having two in a longitudinal direction and three in a transverse direction, the skill block 21 of FIG. 3(b) has the size and shape obtained by combination of nine block units 21a in total so as to have a flat plate shape, having three in a longitudinal direction and three in a transverse direction, the skill block 21 in FIG. 3(c) has the size and shape obtained by combination of three block units 21a in total so as to have a flat plate shape, having three in a longitudinal direction and one in a transverse direction, the skill block 21 in FIG. 3(d) has the size and shape obtained by combination of four block units 21a in total so as to have a flat plate shape, having two in a longitudinal direction and two in a transverse direction, the skill block 21 in FIG. 3(e) has the size and shape obtained by combination of two block units 21a in total so as to have a flat plate shape, having two in a longitudinal direction and one in a transverse direction. Furthermore, the skill block 21 of FIG. 3(f) has the size and shape obtained by combination of five block units 21a in total in the three-dimensional direction, the shape being obtained by attaching two more block units 21a in the transverse direction to two faces of the bottom block unit 21a of the skill block 21 of FIG. 3(c) which are adjacent to each other.

The CPU 2 refers to the attribute data of the skill definition item which is stored in the skill definition item table SDT. On the basis of the block conversion program BTP, and produces an object model 21M of the corresponding skill block 21 on the virtual three-dimensional space on the basis of the system of skill and cube data which correspond to the skill definition item, and displays the model 21M on the display 11 together with the corresponding system data HD through perspective projection and rendering, as shown in FIG. 4.

In case of FIG. 4, the system data HD is the attack system of skill, and concrete technique names of the attack system are represented. On the lower hand of FIG. 4, the image 21M of the skill block 21 which was converted from the skill definition item by the block conversion program BTP is represented. The skill block 21 represented in FIG. 4 is one comprised of the individual block unit 21a.

The other systems of skill, "defense", "attribute change" and "special", which can be selected to be represented through the operation of the controller 14 by the player, are displayed on the display 11. The other system of skill is displayed similar to "attack" skill of FIG. 4 by opening a window of the corresponding system of skill determined on the skill definition item obtained by the player when converting this item into the skill block 21 by the block conversion program BTP. And, the skill block 21 already obtained by the player, which is stored in the outside memory 15, is displayed in such a way that the player operates the controller 14 so as to instruct the CPU 2 to display and then, the window of the corresponding skill is opened on the basis of the skill setting program SDP.

When the player instructs the CPU 2 to display detailed explanation concerning the displayed skill through the further operation of the controller 14 after displaying the system data AD, technique name NAM and object model 21M of the skill block 21 corresponding to the skill definition item which the player obtained in the game on the display 11, the CPU 2 reads the contents data showing the contents of the skill and the method of operation the controller 14 for getting the skill to appear which are the corresponding attribute data out of the skill definition item table SDT. And displays both on the display 11 as explanation ED.

By doing so, the player can clearly understand the obtained skill through the skill definition item obtained by the player. Subsequently, the player refers to the memory cube 20 of the present character displayed on the display 11, and determines at which spatial position in the memory cube 20 the skill block 21 corresponding to the newly obtained skill is arranged.

As already mentioned, twenty six (26) cubical spaces 20a arranged around the core block 22, where the skill block 21 can be installed, are set in the memory cube 20, and the player can freely arrange the newly obtained skill block 21 in the bounds where the new skill block does not collide with the already arranged one. As already mentioned, the skill block 21 corresponding to each skill has various kinds of shapes by proper combination of the block units 21 as shown in FIG. 3. For this reason, the player arranges the new skill block 21 in the space inside the memory cube 20, taking the arrangement of the skill blocks already located in the memory cube 20 into consideration, properly attaching or detaching the skill blocks 21.

When the player designates the optional cubical space 20a in the memory cube 20 as a position where the new skill block 21 is to be located by the controller 14 as shown in an arrow AR of FIG. 4, and instructs the CPU 2 to insert the skill block 21 into the memory cube 20, the CPU 2 reads out skill block arrangement judging program SBP which is a sub-routine of the skill setting program SDP, and computes and judges as to whether or not the skill block 21 designated to be inserted into the memory cube 20 by the player collides with the other already arranged skill blocks 21 and the core block 22 on the basis of the skill block arrangement judging program SBP.

More detailed speaking, when the player instructs to insert the skill block 21 into the memory cube 20 through the controller 14, the CPU 2 computes and judges as to whether or not another skill block 21 has been already arranged on one or more cubical spaces 20a which were instructed to be inserted, that is, as to whether or not there is the arrangement of the empty cubical spaces 20a, where the skill block 21, having the same shape as the skill block 21 which was instructed to be inserted, has not been yet arranged at the position inside the memory cube 20, on the basis of the skill block arrangement judging program SBP.

If there is the arrangement of the empty cubical spaces 20a, where the skill block 21, having the same shape as the skill block 21 which was instructed to be inserted, has not been yet arranged, at the position inside the memory cube 20, the CPU 2 allows the instruction of arrangement of the new skill block 21 through the controller 14, and arranges the object model of the skill block 21 at this position. And, an image, wherein the new skill block 21 was arranged on the position on the memory cube 20 which was instructed by the player, is newly produced by picturing through the picture processor 8, and is displayed on the display 11.

If there is not the arrangement of the empty cubical spaces 20a, where the skill block 21, having the same shape as the skill block 21 which was instructed to be inserted, has not been yet arranged, inside the memory cube 20, it is impossible to arrange the skill block 21 in the present state, so the skill block arrangement judging program SBP displays such message that it is impossible to insert the skill block 21 into the memory cube 20, and displays a message on the display 11, which invites the player to produce the arrangement of the cubical spaces 20a in which the skill block 21 is to be inserted by proper attachment or detachment of the skill block 21 which has been arranged in the present memory cube.

Receiving this message, the player refers to the memory cube 20 displayed on the display 11, and detaches one or more skill blocks 21 which has been already arranged in the memory cube 20 so as to move the other cubical spaces 20a inside the memory cube 20 or so as to store the detached skill block 21 in a non-use skill block storage area (will be described hereinafter) without inserting in the memory cube 20. The player thus instructs the CPU 2 through the controller 14 to detach the skill block 21 in order to change the shape of the arrangement of the cubical spaces 20a having no skill block 21 so that the arrangement of the cubical spaces 20a corresponding to the skill block 21 to be newly arranged can be formed. Whenever the player detaches and moves the skill block 21 inside the memory cube 20 which has been already arranged, the skill block arrangement judging program SBP computes the condition of the arrangement of the empty cubical space 20a inside the memory cube 20, and computes and judges as to whether or not the new skill block 21 can be arranged. If the ability of arranging the new skill block 21 was judged, the ability message is displayed on the display 11, and the image, wherein the new skill block 21 was arranged at the position in the memory cube 20 instructed by the player, is newly produced and is displayed on the display 22 through the picture processor 8.

While properly detaching the skill block 21 already arranged, the player may judge some skill block 21 detached from the memory cube 20 not to be arranged in the memory cube 20 for a while. In this case, the skill block 21 is stored in the predetermined non-use skill block storage area of the outside memory 15 with the skill setting program SDP upon receipt of the instruction by the player through the controller 14. The skill block 21 stored in the non-use skill block storage area is controlled to be read out by the skill setting program SDP and to be enable to be arranged in the memory cube 20 whenever the player operates the controller 14.

The player thus finds the position inside the memory cube 20 for locating the newly obtained skill block 21, having a feeling of solving a puzzle by detaching the already located skill block 21 or moving the detached to the other cubical space 20a portion, thereby giving fun of puzzle game to the skill setting action for the character. Besides, more skills can be obtained if each skill block 21 can be effectively inserted into the memory cube 20, so that the player can proceed with the game, enjoying the skill installation action itself.

The system of the skill of the skill block 21 which is located in the memory cube 20 is not a problem when locating the skill block 21. The skill, such as attack, defense, attribute change and special technique, can be freely furnished in the bounds where the skill block can be stored in the memory cube 20 regardless of the category. Then, the degree of freedom of skill installation can be rapidly increased, and the skill can be set on each character, matching the player's taste, so that the fun of the game increases.

After the optional skill block 21 was located in the virtual space inside the memory cube 20 without collision with another already located skill block 21 by the instruction of the player, the skill setting program SDP computes all skills corresponding to all skill blocks 21 located inside the memory cube 20, and controls to give the skills to the character corresponding to the memory cube 20. Thereafter, the game program GPR Controls the character to exert the skill corresponding to the skill block 21 installed in the memory cube 20 in the game world, and controls to display on the display 11.

In the above-mentioned embodiment, the memory cube 20 for locating the skill blocks 21 which is the block arrangement space set so as to correspond to the character is defined as a space comprised of twenty seven cubical spaces 20a in total having three on each side. But, the shapes of the block arrangement space and the cubical space are optional, and the block arrangement space may be a rectangular parallelepiped where each side has the different number of cubical spaces 20a, that is, the block arrangement locations, or may have the other solid shape. Besides, the shape of the cubical space may not be a cubic, but may be a rectangular parallelepiped or a tetrahedron. Furthermore, the block unit comprising the skill block may have two-dimensional plane shape, such as a square and the other optional plane shape, and the block arrangement space may be a square, a rectangle or a plane space having a proper shape, for locating a plurality of skill blocks. In this case, the block arrangement locations for locating each skill block are formed in the block arrangement space, corresponding to each block unit (formed with a sprite).

Furthermore, the shapes and the sizes of the block arrangement space, the block arrangement location, the skill block and the block unit can be optionally set as long as the block arrangement space having a predetermined shape is provided with the predetermined number of block arrangement locations, and the skill block corresponding to the skill of the character is arranged at the block arrangement location in order to set the skill of each character.

In the above-mentioned embodiment, the CPU 2 is the game control device, and the combination of the CPU 2 and specified software comprises various kinds of means of the game control device. But, at least a part of such means may be replaced with a logical circuit. The invention may be comprised as the game system having various kinds of scales in addition to one for home use.

INDUSTRIAL APPLICABILITY

A skill block corresponding to a skill which a player expects a character to be furnished is located in a block arrangement space having a predetermined shape without a collision with the other skill blocks in order to install optional category of skill in the bounds of the size of the block arrangement space, thereby diversifying the power of the character. The game program for giving a fun of a puzzle to the player at the time of installation of the skill is possible to be provided.

The invention claimed is:

1. Game program being embodied in a computer readable medium for instructing a computer to execute the following procedures, comprising:
   furnishing at least one character with arms, items, guards, and special powers which can be obtained in a game world on the basis of an instruction from at least one player through a controller of said computer; and
   giving said at least one player powers which are respectively defined by an arm, an item, a guard and a special power furnished to said at least one character for developing a subsequent scenario on the basis of said at least one character who obtained said given power;
   said furnishing of said arms, items, guards, and special powers including the following steps;
   a block arrangement space setting procedure, for setting a block arrangement space having a predetermined shape in a predetermined memory, said block arrangement space being set in a virtual space so as to correspond to each character, and having a plurality of block arrangement locations;
   said each block arrangement location forming a block arrangement space having a predetermined space wherein block arrangement locations adjacent to each other, each having the same shape, are continuously connected with each other;

a block conversion display procedure, for converting said item obtained by said at least one player during a game into a skill block with a size and a shape corresponding to said arm, said item, said guard, and said special power, and for generating an image of said skill block and displaying said image on a display;

said each skill block having a shape of one block or combination of two or more blocks so as to have two or more kinds, each said block can be located in said each block arrangement location one by one;

a skill block insertion arrangement procedure, for instructing to insert said converted skill block in said block arrangement location inside said block arrangement space as an object in said virtual space through an instruction of said controller of said computer;

a collision judgment procedure, for computing and judging as to whether or not there is a collision between a position of said skill block to be inserted, which was instructed by said skill block insertion arrangement procedure and said skill block already inserted into said block arrangement space, and for informing a player of said collision if any;

a block arrangement space representation procedure, for producing a picture showing an arrangement state of said skill block in said block arrangement space, and displaying said produced picture on said display; and an arm, item, a guard and special power count procedure, for computing said arm, said item, said guard and said special power of said at least one character corresponding to every skill block arranged in said block arrangement space for said at least one character and for furnishing said character.

2. The game program being embodied in a computer readable medium according to claim 1, wherein said skill block has a plane shape, and said block arrangement space is set as a plane space where a plurality of said skill blocks can be arranged.

3. The game program being embodied in a computer readable medium according to claim 1, wherein said skill block has a three-dimensional shape, and said block arrangement space is set as a three-dimensional space where a plurality of said skill blocks can be arranged.

4. The game program being embodied in a computer readable medium according to claim 1, wherein said block arrangement space setting procedure has a procedure for setting an arrangement prohibitive location, where said skill block is impossible to be arranged, in a specific block arrangement location inside said block arrangement space.

5. The game program being embodied in a computer readable medium according to claim 1, wherein said block arrangement space is a cubical space, and said arrangement prohibitive location is set in almost center of said block arrangement space.

6. A machine including a computer with a game program being embodied in a computer readable medium for instructing the computer to execute procedures, comprising:

arm, item, guard and special power equipment means for furnishing at least one character with arms, items, guards, and special powers which can be obtained in a game world on the basis of an instruction from a player through a controller of said computer; and scenario development means for giving said player powers which are respectively defined by an arm, an item, a guard and special power which furnished are to each said player by said arm, item, guard and a special power equipment means, and for developing a subsequent scenario on the basis of said character who obtained said given power;

said arm, item, guard and special power equipment means further comprising:

a block arrangement space setting means for setting a block arrangement space having a predetermined shape in a predetermined memory, said block arrangement space being set in a virtual space so as to correspond to each character, and having a plurality of block arrangement locations;

said each block arrangement location forming a block arrangement space having a predetermined space wherein block arrangement locations adjacent to each other, each having the same shape, are continuously connected with each other;

block conversion display means for converting said item obtained by said player during a game into a skill block with a size and a shape corresponding to said item, corresponding to said arm, said item, said guard, and said special power, and for generating an image of said skill block and displaying said produced image on a display;

said each skill block having a shape of one block or combination of two or more blocks so as to have two or more kinds, each said block can be located in said each block arrangement location one by one;

skill block insertion arrangement means for instructing to insert said converted skill block in said block arrangement location inside said block arrangement space as an object in said virtual space through an instruction of a controller of said computer;

collision judgment means for computing and judging as to whether or not there is a collision between a position of said skill block to be inserted, which was instructed by said skill block insertion arrangement means and said skill block already inserted into said block arrangement space, and for informing a player of said collision if any;

block arrangement space representation means for producing a picture showing an arrangement state of said skill block in said block arrangement space, and displaying said produced picture on said display; and arm, item, a guard and special power count equipment means for computing said arm, said item, said guard and said special power of each character corresponding to every skill block which was arranged in said block arrangement space for each character and for furnishing said character.

* * * * *